United States Patent
Okulov

(10) Patent No.: US 9,587,721 B2
(45) Date of Patent: Mar. 7, 2017

(54) INFINITELY VARIABLE TRACTION DRIVE EMPLOYING ALTERNATE STEERABLE ROLLERS

(71) Applicant: Paul Okulov, Ste-Anne-de-Bellevue (CA)

(72) Inventor: Paul Okulov, Ste-Anne-de-Bellevue (CA)

( * ) Notice: Subject to any disclaimer, the term of this patent is extended or adjusted under 35 U.S.C. 154(b) by 261 days.

(21) Appl. No.: 14/352,695

(22) PCT Filed: Oct. 19, 2012

(86) PCT No.: PCT/IB2012/055720
§ 371 (c)(1),
(2) Date: Apr. 18, 2014

(87) PCT Pub. No.: WO2013/057701
PCT Pub. Date: Apr. 25, 2013

(65) Prior Publication Data
US 2014/0243146 A1    Aug. 28, 2014

Related U.S. Application Data

(60) Provisional application No. 61/549,235, filed on Oct. 20, 2011.

(51) Int. Cl.
*F16H 15/40*    (2006.01)
*F16H 15/30*    (2006.01)

(52) U.S. Cl.
CPC ............. *F16H 15/40* (2013.01); *F16H 15/30* (2013.01)

(58) Field of Classification Search
CPC ................................. F16H 15/40; F16H 15/30
See application file for complete search history.

(56) References Cited

U.S. PATENT DOCUMENTS 1,141,508 A    6/1915 Weiss
1,146,982 A    7/1915 Weiss
(Continued)

FOREIGN PATENT DOCUMENTS

WO    WO-03/091600 A2    11/2003
WO    WO-2009/006481 A2    1/2009
WO    WO-2011/113149 A1    9/2011

OTHER PUBLICATIONS

Voith Schneider Propeller; www.voithturbo.de.
International Search Report for PCT/IB2012/055720, mailed Mar. 6, 2013; ISA/FIPS.

*Primary Examiner* — David M Fenstermacher
(74) *Attorney, Agent, or Firm* — Harness, Dickey & Pierce, P.L.C.

(57) ABSTRACT

The invention relates to a method for achieving a continuously variable transmission. A power transmission is realized by a drive and driven members creating at least one point of a contact between each other. Each of members may be at least one roller pressed against an opposite members surfaces with virtual surfaces. The method consists in adjustment of movement directions between the surfaces and the roller defined by a first movement vector of the surface relative to contact point, a second movement vector of the roller and a third movement vector of rolling direction of the roller, a steering angle and a correction angle. The steering angle is varied in accordance with a desired transmission ratio and lateral/thrust load on the roller while respecting the deformability of the contact points.

27 Claims, 7 Drawing Sheets

(56) References Cited

U.S. PATENT DOCUMENTS

| | | | |
|---|---|---|---|
| 1,537,515 A | 5/1925 | Weiss | |
| 1,541,882 A | 6/1925 | Weiss | |
| 1,728,383 A * | 9/1929 | Weiss | F16H 37/084 123/185.9 |
| 2,020,123 A | 11/1935 | Pollard | |
| 2,092,437 A * | 9/1937 | Weiss | F16H 15/50 475/186 |
| 2,128,088 A | 8/1938 | Hanft | |
| 2,139,635 A | 12/1938 | House | |
| 2,682,776 A * | 7/1954 | Morgan | F16H 15/00 475/191 |
| 2,959,971 A * | 11/1960 | Salomon | F16H 3/42 192/3.51 |
| 3,039,328 A * | 6/1962 | Christenson | F16H 15/52 475/191 |
| 3,154,957 A * | 11/1964 | Kashihara | F16H 15/28 476/38 |
| 3,789,947 A | 2/1974 | Blumrich | |
| 3,826,157 A * | 7/1974 | Stoll | F16H 15/00 464/106 |
| RE30,981 E * | 6/1982 | Kemper | F01B 3/0023 475/193 |
| 4,487,086 A * | 12/1984 | Broziat | F16H 15/50 476/11 |
| 4,700,581 A * | 10/1987 | Tibbals, Jr. | F16H 15/40 476/37 |
| 4,964,312 A * | 10/1990 | Kraus | F16H 15/38 476/10 |
| 4,964,316 A | 10/1990 | Perkins | |
| 5,071,394 A * | 12/1991 | Lester | F16H 15/50 475/185 |
| 5,330,396 A * | 7/1994 | Lohr | F16H 15/38 476/10 |
| 5,697,863 A * | 12/1997 | Dawe | F16H 15/38 476/10 |
| 5,916,057 A | 6/1999 | Waltz et al. | |
| 5,923,139 A | 7/1999 | Colgate et al. | |
| 5,927,423 A | 7/1999 | Wada et al. | |
| 6,471,617 B1 * | 10/2002 | Kuhn | F16H 15/38 476/40 |
| 6,491,127 B1 | 12/2002 | Holmberg et al. | |
| 6,565,478 B2 * | 5/2003 | Yamamoto | F16H 15/38 476/40 |
| 6,810,976 B2 | 11/2004 | Rohrs | |
| 6,984,189 B2 * | 1/2006 | Suzuki | F16H 15/38 476/40 |
| 7,207,918 B2 | 4/2007 | Shimazu | |
| 7,594,870 B2 * | 9/2009 | Ferrar | F16H 15/50 475/164 |
| 2003/0134707 A1 | 7/2003 | Goldie et al. | |
| 2008/0081728 A1 | 4/2008 | Faulring et al. | |

* cited by examiner

α - angle between vectors of movement of the surface 2 Vs and roller - Vr;

β - steering angle of the roller vs. carrier movement;

θ - correction angle;

Fr - force acting laterally on roller;

Ff - frictional force acting on roller;

Fr' - force acting laterally on roller with frictional force Ff.

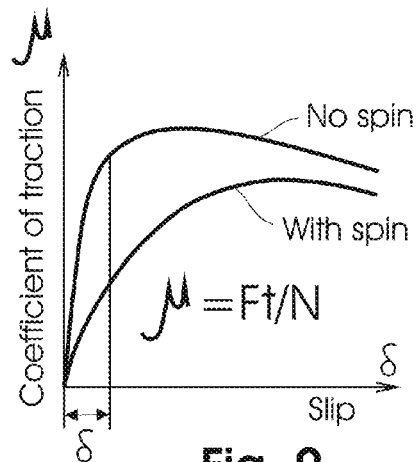
Fig. 9
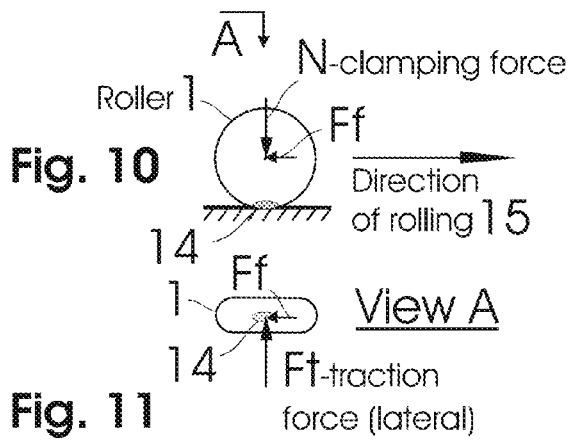
Fig. 10
Fig. 11
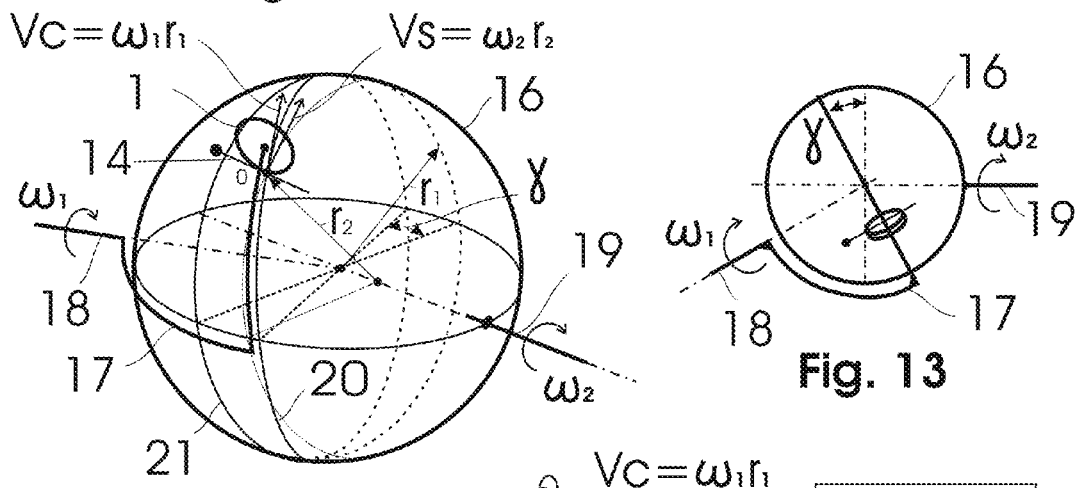
Fig. 12
Fig. 13
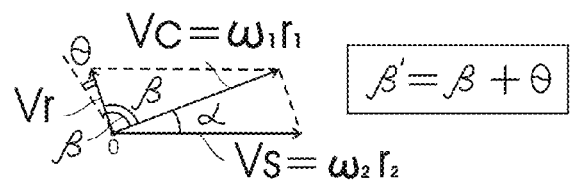
Fig. 14
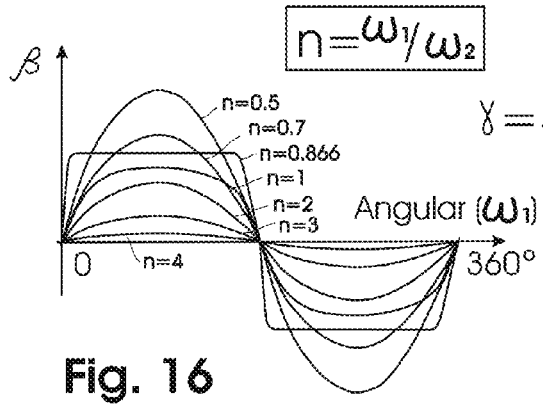
Fig. 16
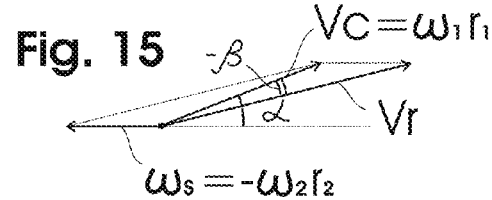
Fig. 15

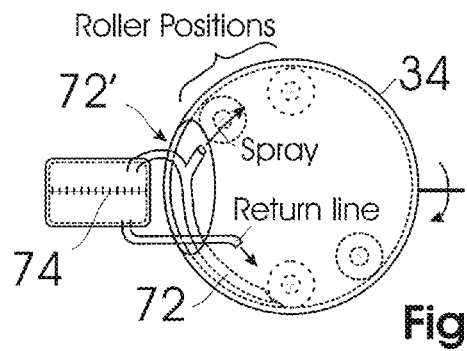
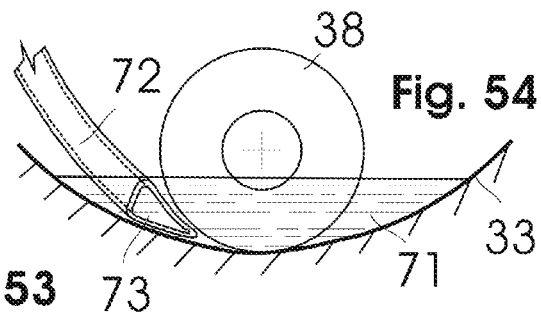
Fig. 53  Fig. 54
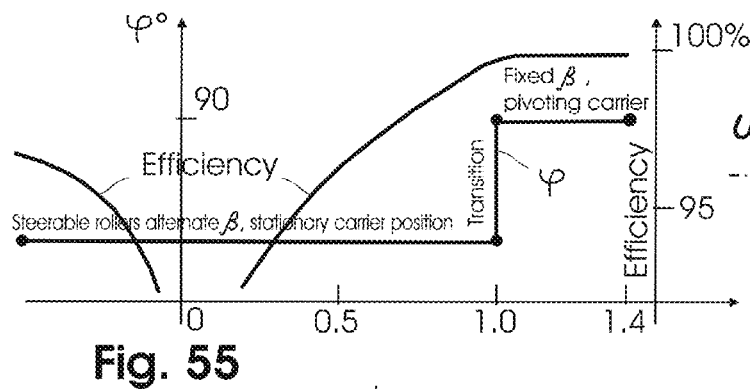
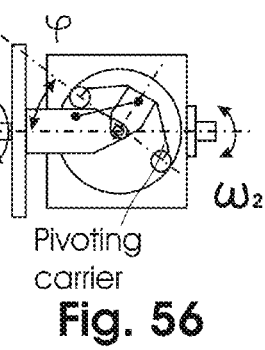
Fig. 55  Fig. 56
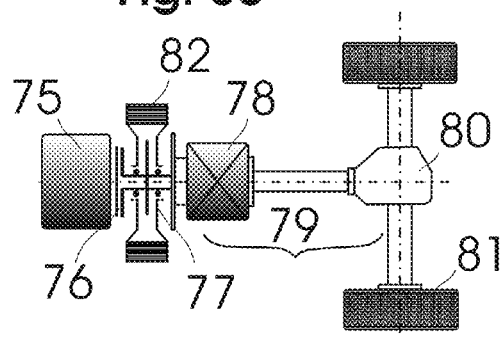
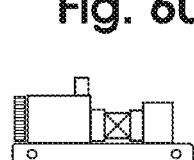
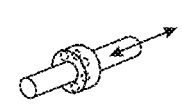
Fig. 57  Fig. 60  Fig. 61
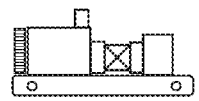
Fig. 62  Fig. 63
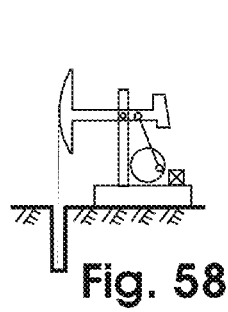
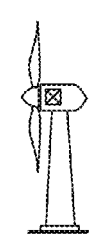
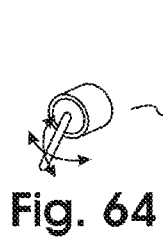
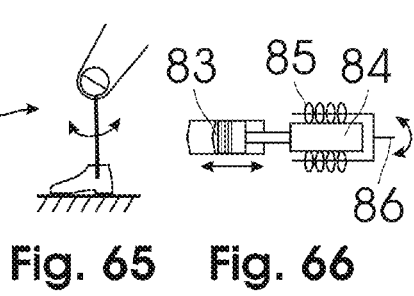
Fig. 58  Fig. 59  Fig. 64  Fig. 65  Fig. 66

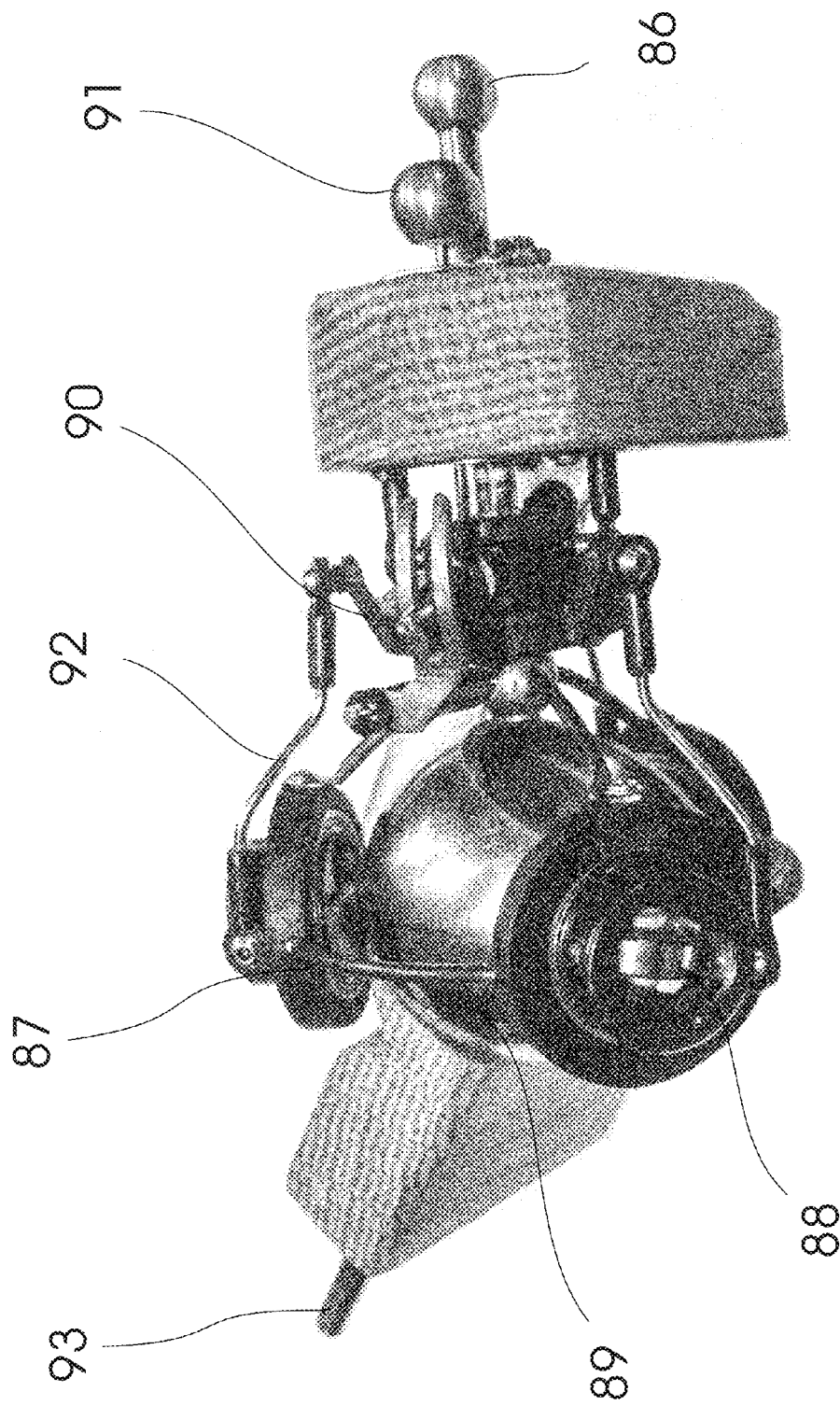
Fig. 67 EXAMPLE

INFINITELY VARIABLE TRACTION DRIVE EMPLOYING ALTERNATE STEERABLE ROLLERS

CROSS-REFERENCE TO RELATED APPLICATIONS

This application is a 371 U.S. National Stage of International Application No. PCT/IB/2012/055720, filed Oct. 19, 2012, which claims priority to U.S. Provisional Application No. 61/549,235, filed Oct. 20, 2011, the disclosures of which are herein incorporated by reference in their entirety.

TECHNICAL FIELD

The present invention relates generally to traction drives and more particularly relates to an infinitely variable transmission for a vehicle, power transmitting device or an actuator with controllable speed of movement and reversible direction of movement.

BACKGROUND ART

Traction drives for vehicles capable of providing either continuously variable (CVT) or infinitely variable (IVT) ratio transmissions have long been recognized as advantageous for many potent applications, such as those in automotive, motorcycle, recreational vehicles, heavy machinery, agricultural, robotic, power generation, oil and gas, HVAC and other industries and settings.

Many, if not most, traction type CVTs or IVTs are similar in the way that they utilize rollers contacting other rotating surfaces (and are met particularly in so-called toroidal, half toroidal, conical, ball type and other transmissions) where rollers transfer power from one rotating body to another while roller's rotational axis can tilt or move thus providing that the contact points at the rotating input and the rotating output are of different distance or radii from rotating bodies axes, thus providing a variable ratio.

In order to achieve IVT mode such devices will typically employ so-called 'power loop' configuration where the unidirectional rotational speed of the output of CVT will be subtracted from the rotational speed of the reference speed of the input. These configurations generally employ differential mechanisms or planetary gear sets to achieve such subtraction therefore reducing the overall efficiency of such devices due to high internal losses the 'power loop' systems are known for.

The rollers, except in the configurations defined by a so-called 'Dual Roller Arrangement' (DRA) WO2011113149 (A1) by Okulov, while permitting the input and output bodies to rotate at different speeds, encounter a substantial spin at traction points which reduce the available traction (in traction fluid based configurations) or cause an excessive wear of the mating rotating bodies in metal-to-metal or other material direct contact devices.

The half toroidal transmissions where spin at rolling contact points is significantly reduced still suffer from the relatively low efficiency, particularly due to high frictional losses in bearings supporting the rollers and withstanding a substantial portion of the entire clamping force.

Because all rollers in most types of prior art transmissions are typically clamped between fairly rigid surfaces, there is a difficulty providing an equal distribution of the clamping forces (necessary for reliable traction in a multi-roller environment) amongst them. The contact points having different clamping force would behave differently in a sense of percentage of the slip experienced under traction load and if the amounts of slip at all points are not harmonized, it will causing appearance of significant internal forces and losses, reducing the overall efficiency. In practice, this disadvantage calls for the number of rollers to be reduced to 3-4 per one pair of input-output bodies (or per one cavity of a toroidal transmission), which limits power density of such transmissions and the maximum torque they can handle.

It is also well known in the trade and practice that traction devices with high spin will exhibit more forgiving behavior and more plasticity (at the cost of reduced traction coefficient compared to its maximum available value at zero spin) compared with the low spin devices, which are sometimes unpredictable in their performance and reliability due to low deformability of traction points.

Numerous examples of CVTs configurations employing spherical bodies driven by rollers is evidenced from U.S. Pat. No. 2,139,635 by House; U.S. Pat. No. 5,923,139 and US patent application 2008/0081728 by Faulring et. A1. These devices exhibit low efficiency and low torque capability due to high spin driving and steering rollers have during manipulation of spherical body.

Another approach to CVTs configurations evidenced from numerous US patents, namely U.S. Pat. No. 1,141,508 by Weiss; U.S. Pat. No. 1,146,982 by Weiss; U.S. Pat. No. 1,469,061 by Weiss; U.S. Pat. No. 1,537,515 by Weiss; U.S. Pat. No. 1,541,882 by Weiss; U.S. Pat. No. 1,728,383 by Weiss; U.S. Pat. No. 2,020,123 by Pollard; U.S. Pat. No. 2,128,088 by Hanft; U.S. Pat. No. 2,682,776 by Morgan; U.S. Pat. No. 2,959,971 by Salomon; U.S. Pat. Nos. 3,826,157; 4,487,086; 4,964,316 by Perkins; U.S. Pat. Nos. 7,207,918; 7,207,918 by Shimazu and U.S. Pat. No. 7,594,870 by Ferrar and is employing a carrier with rollers mounted on it and rotatable in the direction perpendicular to the rotational plane of the carrier and being in a frictional rolling contact with a rotatable spherical surface. The relative angle between the rotational plane of the carrier and the sphere's rotational axis is defining the transmission ratio. At carrier position perpendicular to the rotational axis of the sphere the ratio of the transmission is approximately 1:1.

Over the years, numerous improvements to such CVTs have been disclosed. Still, the deficiency of such transmissions is their inability to provide neutral ratio or 'geared neutral', i.e. to achieve zero output rotational speed when the input is rotating as well as relatively low range of the ratios that can be achieved limited by geometrical constrains of the sphere-carrier pivoting mechanism. Still, another disadvantage of these inventions is low efficiency due to different behaviour of the rollers working in parallel, but sharing different load.

The phenomena of different behaviour of rollers working in parallel under different load conditions can be illustrated as follows:

Let's picture a straight road with two identical cars moving forward, side by side and fighting against strong cross winds in order to maintain its straight moving direction (FIG. 1). Car #1 is experiencing the strongest lateral force from the cross wind and its driver has to apply the correction steering angle θ1 to its left in order to maintain the movement in a straight line. Car #2 is enjoying a shadow from the cross wind provided by Car #1 and has to apply lesser correction steering angle θ2 to its left in order to maintain the movement in a straight line. By doing so the both cars remain moving in parallel and even if they would have been linked together it would not cause any parasitic forces between them. In the systems described in the prior art relevant to present invention, the steering angles of all rollers remain the same regardless of the condition of loading. That disadvantage is manifested by significant losses which origin will be illustrated in more detail later. FIG. 2 provides insight on how the parasitic force between linked cars can lower the efficiency of the system.

Going back to transmissions described here above and incorporating rollers mounted on a carrier and pre-aligned in certain direction it is now clear that unless their steering angles are augmented according to the lateral loads they experience, they would produce unnecessary losses.

There are a variety of vehicles known in robotics which utilize a steerable wheels rotating on a carrier and in contact with ground and where controlled steering can produce omnidirectional movement of such vehicles (U.S. Patents: U.S. Pat. No. 3,789,947 by Blumrich; U.S. Pat. Nos. 5,927, 423; 5,927,423 by Wada et al.; U.S. Pat. No. 6,491,127 by Holmberg et al.; and U.S. Pat. No. 6,810,976 by Rohrs as well as PCT case WO2003/091600 by Rohrs. These systems fail to provide a solution for traction drives, particularly ones utilizing non contact environment with power transferred through the film of traction fluid. Neither of these prior art means is utilizing an augmentation to the steering direction of rollers working in parallel mode mentioned above, which is necessary to optimize the efficiency. Similar systems are also well known from the prior art related to ship propulsions systems (Voith Schneider Propeller; www.voithturbo.de) and some experimental windmills (Vertical Mills).

Therefore, there exists a need for an improved infinitely variable transmission that would provide high efficiency over whole range of ratios, be cost effective, compact, reliable and usable for automotive and other industries mass applications.

DISCLOSURE OF INVENTION

Technical Problem

In general, technical problem for IVTs remain the complexity of the design, necessity to use gear sets in order to achieve zero output ratio and as an effect of it low efficiency (due to high losses in power loops), low power density, high complexity and high costs associated with it. Another problem is that gears, required to achieve infinite ratio produce noise and diminish one of the potential advantages of a traction type transmission, which is its quietness. Each of the above disadvantages reduce usability of such systems for a specific sector of industry. Overall, the entrance of roller type traction CVTs and IVTs to various markets is greatly delayed.

SOLUTION TO PROBLEM

Technical Solution

Utilizing effect of conversion of rolling speed of a rolling body into its lateral speed employed in present invention allows to successfully solve all of the above problems. Its applicability to a great variety of drives, including linear drives, rotary or angular drives and conventional power transmissions is achieved with a single solution of a steerable roller in rolling and traction co-junction with another rotating or moving body (spherical, cylindrical, toroidal, surface, etc.).

ADVANTAGEOUS EFFECTS OF INVENTION

Advantageous Effects

Simplicity: the complete functional device has less that 13 main parts made of conventional materials similar to those employed in rolling bearings, thus providing for low cost and high manufacturability of present invention.

Gears are not necessary: the zero output and infinitely variable ratios can be achieved without employment of geared stages (like planetary or differential drives needed to create mechanical power loops), thus the cost and noise are further reduced without departure from the high torque transfer capabilities.

Applicability to a broad variety of applications with full effect achieved using the same principle of operation: linear variable drives, rotary or angular drives, industrial equipment power drives, vehicle transmissions, etc.

Low noise.

High efficiency of operation and high power density.

Simplicity of controls: mechanical, electro-mechanical or hydraulic actuators can be employed for rollers steering and overall ratio control.

BRIEF DESCRIPTION OF DRAWINGS

Description Of Drawings

Figure 1:
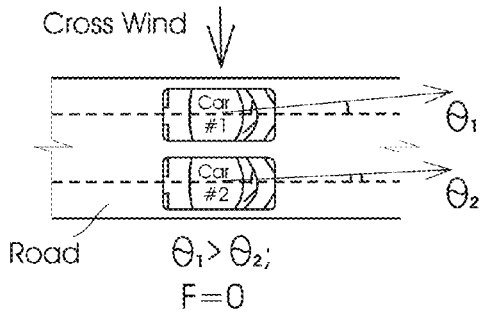
Figure 2:
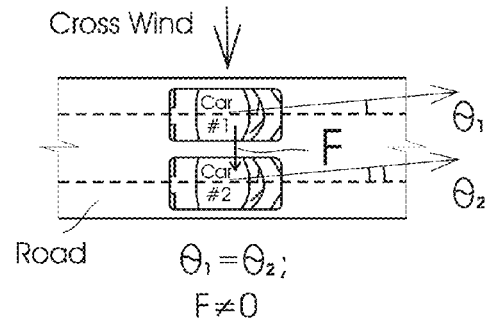
Figure 3:
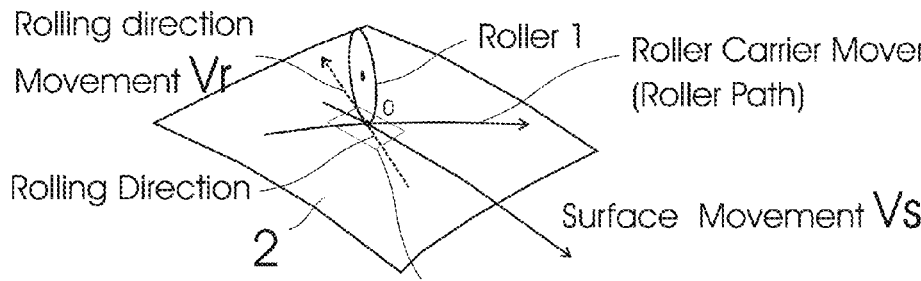
Figure 4:
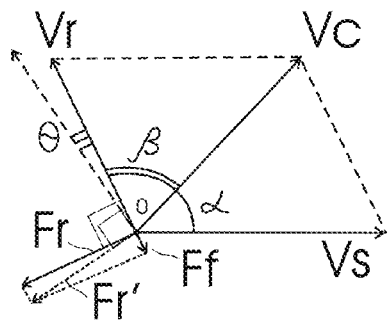
Figure 5:
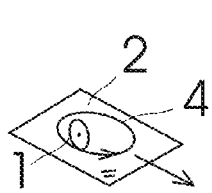
Figure 6:
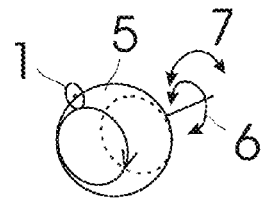
Figure 7:
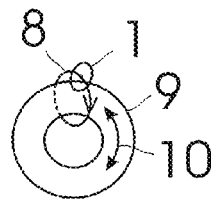
Figure 8:
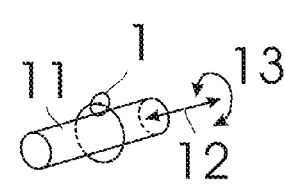
Figure 17:
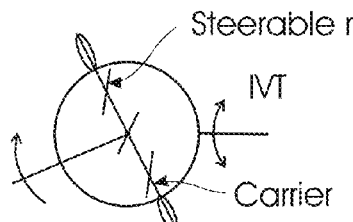
Figure 18:
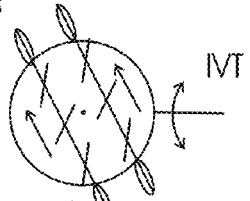
Figure 19:
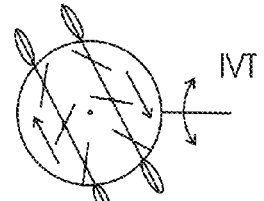
Figure 20:
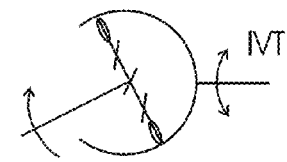
Figure 21:
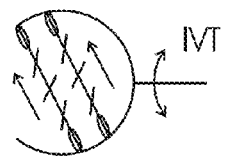
Figure 22:
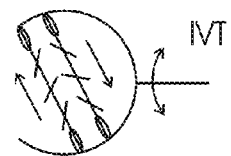
Figure 23:
Figure 24:
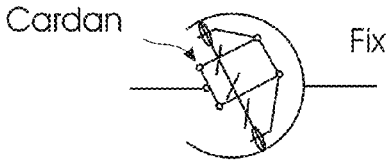
Figure 25:
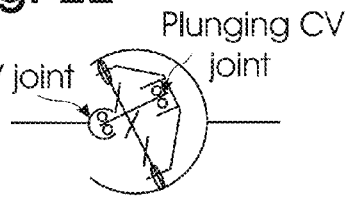
Figure 26:
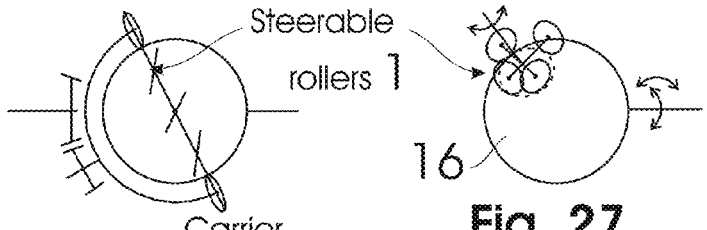
Figure 27:
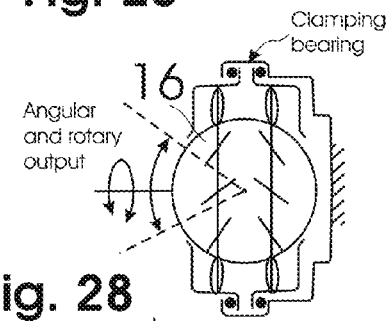
Figure 28:
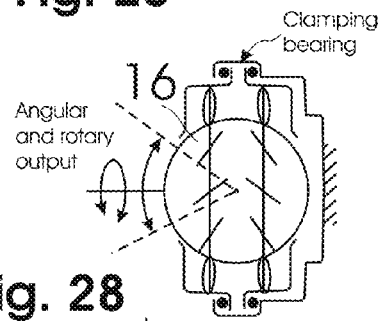
Figure 29:
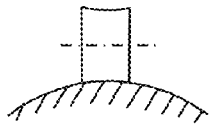
Figure 31:
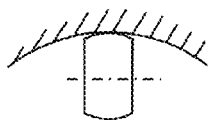
Figure 30:
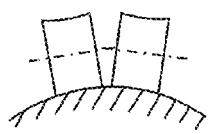
Figure 32:
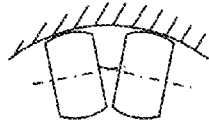
Figure 33:
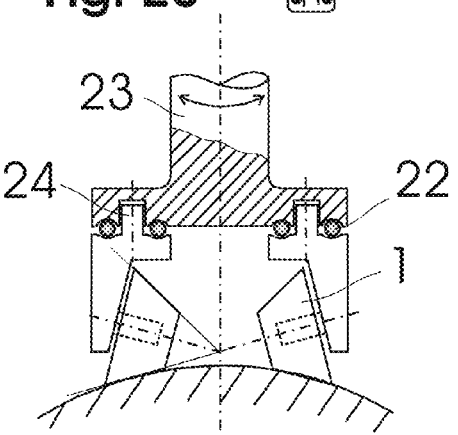
Figure 34:
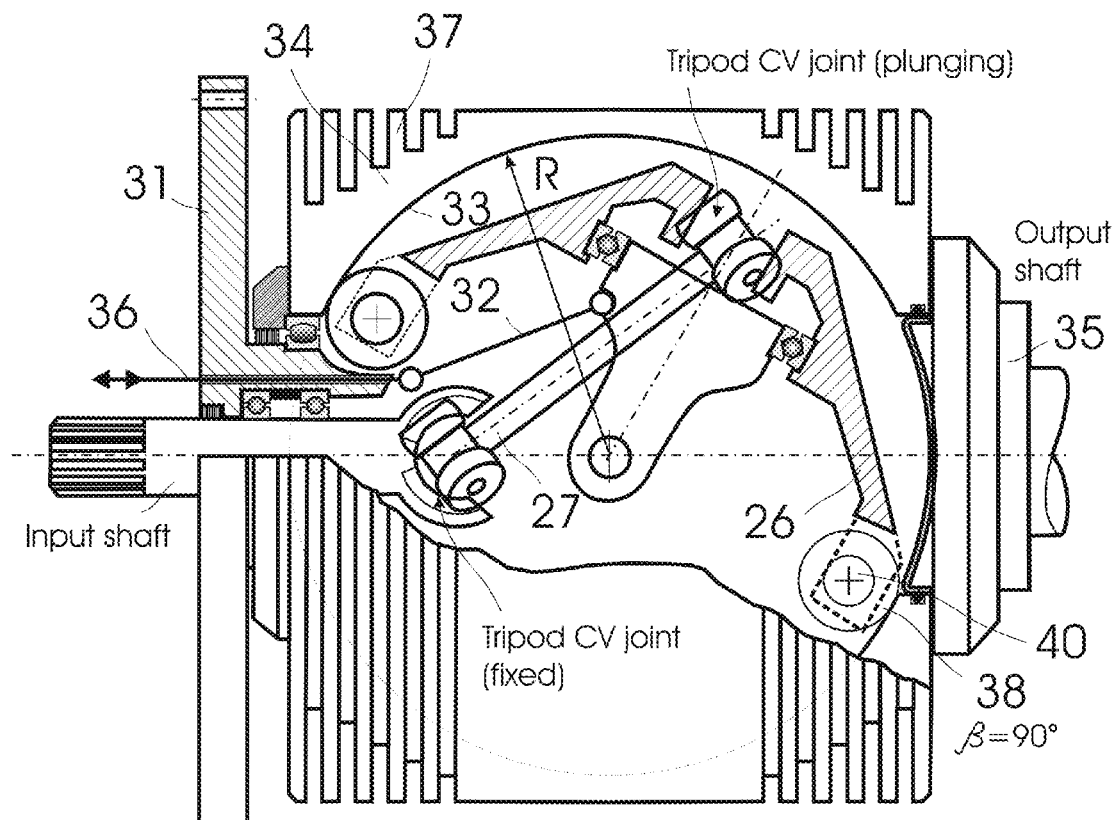
Figure 35:
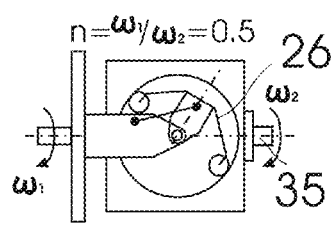
Figure 36:
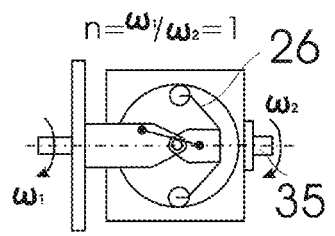

Below is description of drawings and illustrations:

FIG. 1 and FIG. 2 are illustrating the principle of work of rolling traction steered bodies connected in parallel, but being loaded differently;

FIG. 3 is a an illustration of general principle of the present invention represented by a roller and a surface;

FIG. 4 further demonstrates the effect of augmentation of the steering angle of a roller and forces thereof;

FIG. 5 is a representation of present invention adapted to a roller moving in a circular path across a surface;

FIG. 6 illustrates a steerable roller orbiting a spherical body;

FIG. 7 shows a roller orbiting a toroidal body;

FIG. 8 presents a linear actuator utilizing steerable roller per present invention;

FIG. 9 shows a typical traction fluid curves with no spin and with spin condition of a traction point as well as it indicates difference in traction of traction points having the same slip rate 'δ';

FIG. 10 illustrates a traction roller being clamped against surface by clamping force 'N';

FIG. 11 shows lateral traction force and force coming from friction losses due to roller rotation under the load 'N';

FIG. 12 presents forces and vectors of movement of the roller connected to carrier and orbiting a sphere, where axes of rotation of the carrier and sphere intersect, but are not parallel;

FIG. 13 further illustrates top view of the diagram from FIG. 12 and indicates angle 'γ' (gamma) between plane of rotation of the carrier and the output axis (here and throughout of the present description the input and output can be swapped without departure from the spirit of present invention, i.e. an output can work as an input and so forth);

FIG. 14 presents a diagram of vectors of speeds describing positive ratio between input and output (same direction of rotation);

FIG. 15 presents a diagram of vectors of speeds describing negative ratio between input and output (opposite direction of rotation);

FIG. 16 illustrates steering angles 'β' (beta) variation depending of the desired ratio 'n', angular position of the roller 'w' (omega) for the fixed angle γ=30° (augmentation angle 'θ' necessary for maximizing the efficiency not shown);

FIGS. 17-19 illustrate a variety of configurations of the roller carrier surrounding a spherical rotating body;

FIGS. 20-22 illustrate a variety of configurations of the roller carrier inside a spherical rotating body;

FIG. 23 shows geared configuration of the transmission input with fixed angle 'γ' (gamma) between the plane of rotation of carrier and the output axis;

FIG. 24 shows configuration of the transmission input with variable angle 'γ' (gamma) between the plane of rotation of carrier and the output axis and a double Cardan Constant Velocity Joint;

FIG. 25 shows Constant Velocity Joints configuration of the transmission input with variable angle 'γ' (gamma) between the plane of rotation of carrier and the output axis and utilizing one fixed and one plunged tripod or ball joints;

FIG. 26 illustrated geared input allowing for either fixed or variable angle 'γ' (gamma);

FIG. 27 illustrates a drive per present invention utilizing carrier with steerable rollers providing unlimited combination of movements to a rotating body;

FIG. 28 further describes an angular drive utilizing two carriers of steerable rollers rotating in opposite directions and shows its clamping mechanism;

FIGS. 29-30 illustrate variants with either a single or dual rows of rollers carried by the same carriage and in contact with convex spherical surface;

FIGS. 31-32 illustrate variants with either a single or dual rows of rollers carried by the same carriage and in contact with concave spherical surface;

FIG. 33 illustrates in greater detail an assembly of steerable rollers mounted on rotating carrier as per FIG. 27 and optimized to reduce the spin at rolling contact (tapered rollers);

FIG. 34 illustrates a Continuously Variable Transmission per preferred embodiment utilizing rotating housing with cooling fins, pivoting carrier and rollers positioned at approximately 90° angle vs. the rotational plane of the carrier (steering angle augmentation means not shown);

FIG. 35 presents a diagram of transmission per FIG. 34 with ratio n=ω1/ω2=0.5 (n=omega1/omega2=0.5) providing efficiency ~96%;

FIG. 36 presents the same transmission as per FIG. 35, but with ratio n=1/1 and providing efficiency near 100%.

Figure 37:
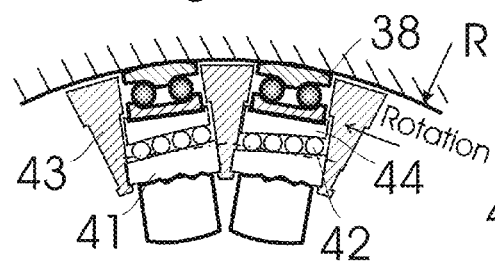
Figure 39:
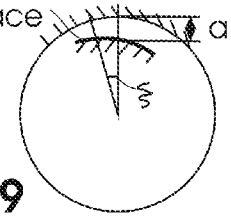
Figure 38:
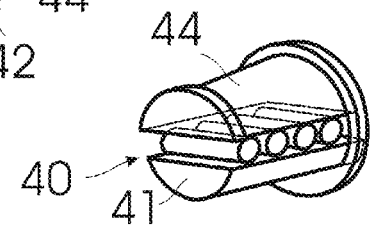
Figure 40:
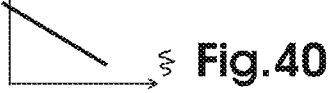
Figures 46, 47:
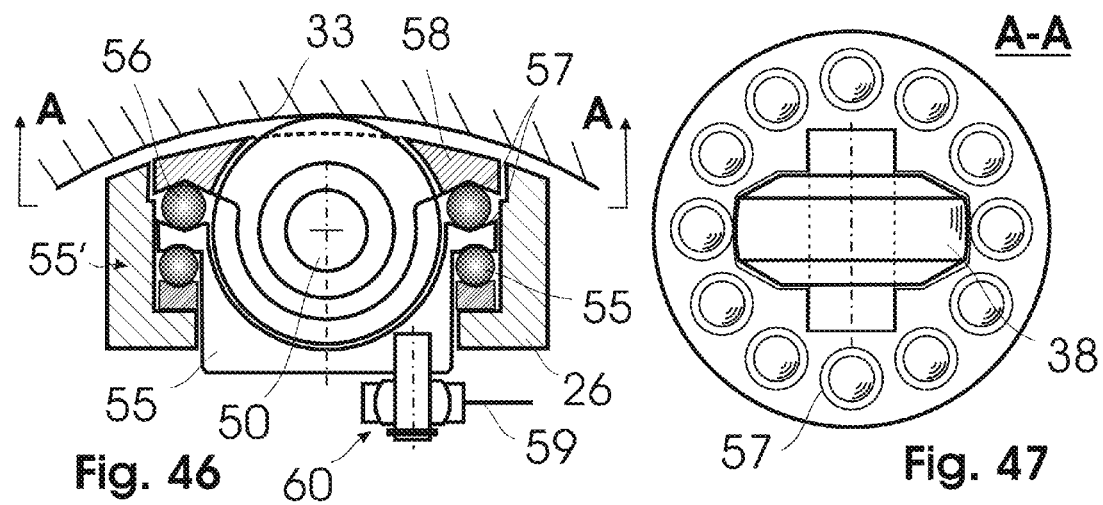
Figures 48, 49, 50, 51:
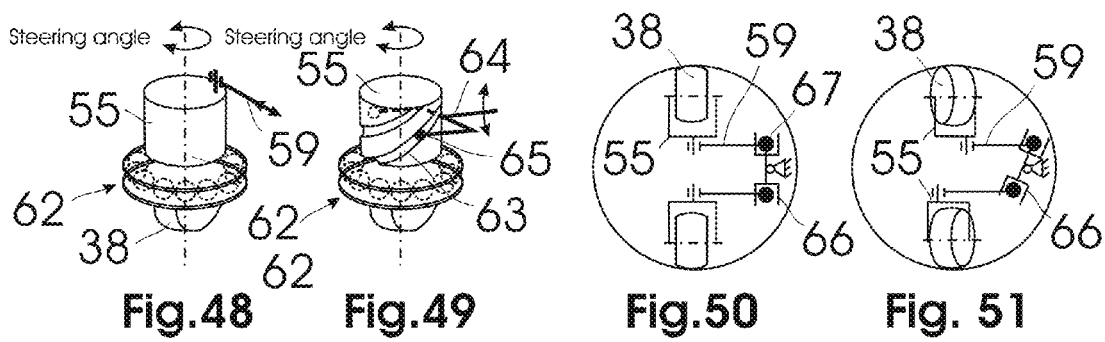

FIG. 37 describes rollers clamping system providing for linear clamping force depending on angle 'ξ' (zeta) of angular displacement of roller support vs. ramp represented by a beam inserted into roller axle sleeve;

FIG. 38 shows the beam surface relative to the curvature of the sphere and denotes distance 'a' varying with the angle 'ξ' (zeta);

FIG. 39 shows clamping mechanism rollers rotatably positioned on the beam or ramp and between said ramp and insert;

FIG. 40 illustrates linear function of the distance 'a' vs. angle 'ξ' (zeta);

FIGS. 41-45 shows a variety of rollers arrangements suitable to fit present invention and providing low frictional losses from clamping force 'N' and from lateral force 'Ft';

FIG. 46 describes a steerable roller associated with clamping device consisting of balls in conical groves, thrust bearing and a pivoting link necessary for steering;

FIG. 47 illustrates clamping balls providing for clamping irrelevant to the orientation of the roller direction of steering and the vector of the thrust force 'Ft';

FIG. 48 shows roller steering and clamping assembly utilizing a pivoted link and actuator for steering;

FIG. 49 provides details of steering mechanism utilizing helical groove associated with actuator;

FIG. 50 further details a swash plate acting as an actuator and providing variation of steering angle described in more detail in FIG. 16.

Figure 52:
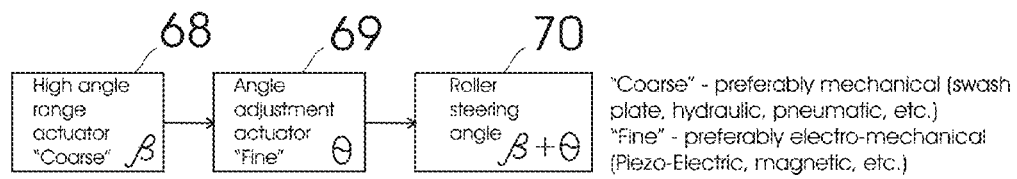

FIG. 51 shows the same swash plate tilted and providing rollers steering;

FIG. 52 describes an algorithm of augmentation of the steering angle utilizing a high angle range actuator (for instance a swash plate) and a low angle range (fine) actuator working in series (control and computing means as well as sensory means necessary for this function are not shown);

FIG. 53 provides details of the lubrication system per present invention using dynamic pick-up tube lowered into rotating ring of oil inside the rotating sphere;

FIG. 54 further details the pick-up tube with scooping opening in close proximity to the 'bottom' position of the rollers;

FIG. 55 illustrates IVT mode of transmission where for ratios over 1:1 the rollers are fixed at approximately 90° and roller carrier is pivoting to change the ratio, and another range where rollers are steerable and the carrier can be either fixed or pivoting;

FIG. 56 further illustrates pivoting angle 'φ' (phi) of the carrier vs. sphere rotational axis;

FIG. 57 shows an arrangement of a drive train of a vehicle, where energy of braking can be converted via IVT into rotational motion of a flywheel and stored for regeneration during acceleration.

The following figures illustrate useful applications of present invention, namely:

FIG. 58—oil well pump variable drive;

FIG. 59—wind mill alternator variable drive;

FIG. 60—boat or ship propulsion system variable drive;

FIG. 61—passenger car variable transmission;

FIG. 62—thermal engine coupling with alternator;

FIG. 63—linear drive with variable speed and/or direction;

FIG. 64—angular actuator;

FIG. 65—actuator for an artificial knee, robotic device or prosthesis;

FIG. 66—piston engine, compressor or pump having direct rotational output with variable speed and variable displacement volume, and FIG. 67—a practical working model incorporating an input connected to a carrier with three steerable rollers controlled by a swash plate and an output connected to a sphere.

BEST MODE FOR CARRYING OUT THE INVENTION

Best Mode

One aspect of the present invention includes a method for achieving an infinitely variable drive by providing a drive member and a driven member either of which can be represented by at least one roller pressed against an opposite member's surface thus creating at least one point of frictional contact capable of transmitting power and additionally creating a virtual surface tangential to the roller and to the said surface at said contact point; the first direction of movement defined by the vector V1 of movement of said surface relative to said contact point and the second direction of the movement defined by the path comprised of the vector V2 of the movement of said roller as projected to said virtual surface; and the third direction as defined by the vector Vr of rolling direction of the roller as projected to said virtual surface where the angle α between V1 and V2 and the steering angle β between V2 and Vr are defined by the following equation wherein the correction angle θ for each roller is varied in accordance with lateral/thrust load on the roller and respects the elastic/elasto-plastic/plastic deformability of said traction points of contact for a given physical condition of the contact:

Some variants:

$$\beta = \arcsin(V1/Vr * \sin(\alpha)); (\text{beta} = \arcsin(V1/Vr * \sin(\text{alpha})))$$

$$\beta = 90° - \arccos(V1/Vr * \sin(\alpha)); (\text{beta} = 90° - \arccos(V1/Vr * \sin(\text{alpha}))).$$

Another aspect of the present invention includes an infinitely variable transmission or variable angular or linear actuator or both with input member and the output member surfaces of bodies of rotation frictionally contacting each other and capable of moving relative to each other at speeds determined by the desired transmitting ratio where either member can be represented by at least one steerable roller in junction with the opposite surface defined by at least one frictional point between said surfaces wherein: while rolling, said frictional point's trajectory as it would be drawn on the surface of the opposite member resembles a cycled helical path and wherein the rolling direction of the roller can alternate during one movement cycle over said path from a negative to a positive angle compared to the alignment of the said rolling direction of the roller with the direction of said surface at the points where and when it is generally aligned with the direction of said rolling of said roller on said helical path.

In still another aspect, this invention includes a traction drive with input and output members wherein either one of them is represented by a body with surface and another one is represented by at least two steerable rollers being in contacting relation by its outer surfaces with said surface of the opposite member by at least two junctions capable of transferring power primarily through friction, where said rollers are carried by a carrier wherein the normals to said surface at the junctions are generally intersecting at one point, said carrier is rotatable and said rollers are steerable alternating their rolling direction depending on: the desired ratio of transmission of movement from said input to said output members, their relative angles of movement against each other at said contact junctions and the deformations of said contact junctions under the traction load.

In yet another aspect, this invention includes a variable transmission having input and output members comprised of rotating bodies in frictional and rolling contact one to another where at least one body is represented by a steerable roller and each contact junction is loaded by a clamping force controlled individually and which depends on the amount of traction force vector perpendicular to the rotational direction of each of said rollers and where said clamping force is controlled independently from said steering angle.

Referring now to the accompanying description and figures, the present invention is directed towards achievement of infinitely or continuously variable transmissions or actuators allowing rotary, linear, angular or combined output movement with controllable ratio compared to the input and/or allowing to alternate the direction of movement. This invention may be well suited for many applications in which such transmissions or actuators are potentially useful and/or advantageous. The ability to transfer motion or rotation in any direction is very advantageous for most industrial applications including actuators or vehicles that must be driven in forward or reverse, including passenger cars, trucks, kinetic energy recovery systems (for instance, energy from braking) and energy accumulators, actuators, drives, conveyors, oil pump jacks, reciprocating to rotary movement converting drives, etc. Additional applications may include wide range of robotic applications, variety of articulated mechanical systems, artificial motorized limbs and prostheses, watercrafts and recreational vehicles, and the like. Detailed description is further described in the accompanying drawings:

FIG. 3 shows a single rolling body 1 adjacent to and in traction engagement with surface 2 defining its movement by speed vector Vs. A surface itself will represent surface of any rotating or moveable body. Vector Vr defines the direction of rolling where vector Vr is generally lies in the roller 1 plane of rotation. Roller 1 is supported by a carrier (not shown) with its own path of movement relative to surface 2 and defined by vector Vc. A plane tangential to the surface 2 at the point of contact by body 1 creates a virtual plane 3 (tangental surface).

More specifically the relationship between vectors of speed is shown in the FIG. 4.

Here the angle α (alpha) is created between vectors Vs and Vr; angle β (beta) is between vectors Vc and Vr. We will call this angle a 'steering angle'. Correction angle θ (theta) will define augmentation to steering angle needed to synchronize lateral steering in more detail illustrated by diagrams shown in FIG. 1 and FIG. 2 (example with cars). Accordingly, the roller 1 experiences lateral force Fr, perpendicular to vector Vr and a relatively small frictional force Ff, aligned with direction of rolling thus causing composed vectorial force Fr' to become slightly misaligned with direction perpendicular to vector Vr. The correction angle, therefore can be defined as angle between speed vectors of forces Fr and Fr'.

Several modes of use of present invention further described in FIGS. 5-8. Namely, FIG. 5 shows roller 1 supported by a carrier and circling the surface 2 (circle 4). FIG. 6 shows roller 1 orbiting the spherical body 5 thus capable of inducing rotating motion 6 or/and tilting motion 7 of said sphere 5. FIG. 7 provides for a drive where roller 1 is orbiting toroidal surface 9 thus providing for controlled rotational motion 10 of it. FIG. 8 illustrates the relative position of roller 1 and a cylindrical surface 11, providing for controllable linear motion 12 and rotational motion 13 of surface 11.

General art illustration of effect of spin on coefficient of friction in traction bodies is presented in FIG. 9. Depending on spin effect, the same slip under the load will effect different traction capacity of the frictional point. Accordingly, same traction load will cause points of friction to slip at different rates, making it necessary to synchronize roller working in parallel to avoid parasitic losses due to their improper alignment (apply correction angle).

FIG. 11 denotes relation of the roller 1 and surface 2 and clarifies definition of forces where N is clamping force acting on the roller axle and equal to the contact force at point 14 and Ft is lateral traction force acting generally perpendicular to the direction of rolling 15.

Roller 1 positioning against a spherical body 16 is illustrated by the FIG. 12. Carrier arm 17 supports the roller 1 and its own carrier (not shown) and is connected to the input shaft 18. The roller 1 is orbiting sphere 16 with some angle of inclination of the plane of the orbit to the plane perpendicular to the rotational output axis 19 and denoted as γ

(gamma). View from the top of this assembly is shown in the FIG. 13. Accordingly, the linear speed Vc of the roller's 1 contact point 14 in the plane of orbit 20 and the linear speed Vc of the same point in the plane of rotation 21 of sphere 16 create the familiar diagram of speed vectors shown above in the FIGS. 3 and 4 and is also shown in more detail in the FIG. 14. FIG. 14 also shows correction angle theta described above and its addition to the steering angle.

At different angles of inclination γ (gamma) of the carrier orbit 20 and different ratio of transmission of rotational speeds between input shaft 18 and output shaft 19, and angular position ω1 (omega1) of the roller 1 carrier the steering angle β (beta) has different values, the values which are oscillating during one revolution (FIG. 16). Negative speed is also easily achievable as it can be seen from the diagram of the speed vectors shown in the FIG. 15.

Variants showing further details of carrier to sphere arrangement are further described in FIGS. 17-22. A single carrier with multiple steerable rollers orbiting around a sphere is shown in the FIG. 17. The same arrangement, but employing inner positioning of the carrier relative to the sphere (hollow sphere) is shown in the FIG. 20. Double carrier configurations with carriers rotating in one direction are illustrated, accordingly for the outer carrier in the FIG. 18 and for the inner carrier in the FIG. 21. Carriers rotating in opposite directions are shown: for the outer carrier in the FIG. 19 and for the inner carrier in the FIG. 22.

A variety of means applicable to create the inclination of the orbit of carrier rotation are self explanatory and are shown in FIGS. 23-26. Those include, but not limited to: inner carrier bevel gear drive (FIG. 23), Cardan drive (FIG. 24), constant velocity (CV) joint (FIG. 25), outer carrier bevel gear drive (FIG. 26). Alternatively, the steerable rollers 1 can circle the sphere 16 only partially, as it is shown in FIG. 27.

FIG. 28 provides details of the arrangement suitable for two-freedoms ball joint providing for tilt and rotational movement of the output shaft. This arrangement is particularly beneficial for knee or other joint replacement and artificial limbs for medical industry. Due to limited range of speeds needed, in this case roller steering angle can alternate in a very small range and steering actuators like Piezoelectric type become suitable.

Further to it, FIG. 29 and FIG. 30 accordingly show a single and a paired roller arrangement with positive curvatures of the roller rim surface adapted for the highest contact bearing capacity for "outer" roller carrier (rollers orbiting around the sphere). The FIGS. 31 and 32 show similar arrangements, but for the "inner" roller carrier (rollers orbiting inside the sphere). More detailed description of the roller carrier operating per diagram presented in the FIG. 27 is shown in the FIG. 33. Here the rollers 1 are supported by rotating carrier 23. Each roller is steerable by providing pivoting shafts 24 and has a thrust bearing 22 taking the clamping load. This system can provide for any direction of rotation of the surface of the sphere 16.

Practical design of the CVT with tiltable inner carrier of rollers is further described in the FIG. 34. The input shaft (which can serve as well as an output shaft) 25 is linked to the rollers carrier 26 through tripod constant velocity joint 27. The carrier 26 main bearing 28 is supported by pivoting support 29 mounted pivotally on the extension 30 of the flange 31 used for external mounting of the CVT. The carrier 26 and its pivoting support 29 can be tilted using a control link 32 thus providing for change of ratio of the CVT by means of actuator 36. Spherical surface 33 is provided by a rotating body 34 connected with output shaft and having cooling fins 37.

Rollers 38 are positioned at fixed steering angle of approximately 90° (β(beta)~=90 degrees) for this simplified case providing a limited practical range of ratios and can have additional means for compensation or correction of the steering angle in smaller range. For change of ratio the pivoting support 29 is tilted as shown in the FIG. 35 and for 1:1 transmission ratio the orbit of the rollers 38 supported by carrier 26 is perpendicular to the axis of the output shaft 35 as shown in the FIG. 36. At this ratio the efficiency of the CVT reaches 100%.

Clamping system acting individually on each roller is shown in the FIG. 37. Here the carrier 26 has slots 39 receiving rollers 38 with axes 40 composed of a beam 41 with ramp 42 and rollers 43, and an insert 44 (FIG. 38) allowing to complete the linear bearing and provide for the roller 38 not only rotational axis, but also clamping system. Under lateral force acting on traction point and depending on the angle of the ramp 42 clamping force can be produced. The ramp profile can be linear or curved, as shown in the FIG. 37, which allows to achieve desired function of the clamping force from lateral force and compensate for non-linear compressibility of the system.

There are a variety of roller support arrangements capable of providing low frictional roller rotation, bearing of clamping force and lateral force (thrust) coming from traction. Several variants are shown in the FIGS. 41-45. For instance, a roller 38 assembly capable of serving any of the configurations per present invention, can have rim surface 38 of special curvature and integral inner race 54 in contact with rollers or needles 46 running over shaft axle 50. For receiving thrust force, symmetrical grooves forming angular bearings with balls 45 can be used. The axle 50 has races 51 fixed to it for completing the angular bearings.

Figures 41, 42, 43, 44, 45:
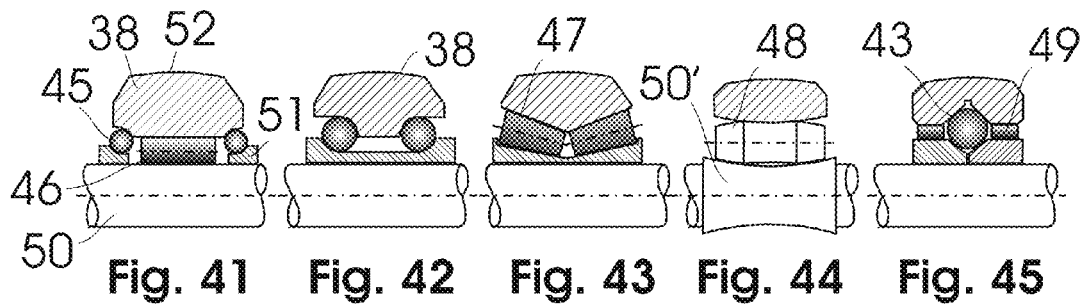

Same configuration, but without rollers 46 is shown in FIG. 42. Here the bearing outer races are integral with roller 38 body and the inner race can be either integral with axle 50 (not shown) or be connected to it as a separate part. Further to it, tapered rollers 47 can be employed (FIG. 43), dual curvature rollers 48 with axle 50' adjusted for contact with them (FIG. 44), a combination of a four contact bearing generally denoted as 53 and composed of separable inner races and outer race integrated with roller (FIG. 45) and other combinations of the above.

Such rollers adapted for steerable roller IVTs or CVTs configurations (requiring alternate angles of steering) are located inside rotating housing 55 (FIG. 46), which is supported by a thrust bearing 55' connected to or part of the carrier 26. For achieving independent clamping of the rollers, there are a number of balls 56 or other shape bodies positioned in conical seats (or sockets) 57. Under lateral force applied to the roller 38, at any direction, the conical seats 57 in the rotating housing 55 and adjacent seats 57 in the roller support 58 act as ramps allowing clamping force to be created and maintained, which value is generally proportional to the lateral force and depends on the angle of the conical surface of the seats 57. In order to steer the rollers 38, link 59 pivotally connected through a ball joint 60 to pin 61 which is connected to the rotating housing 55 can be used. The clamping assembly is therefore denoted as 62.

This steering link is further described in the FIG. 48. In another configuration the rotating housing 55 can have helical groove 63 with cam followers 65 operable by actuator arm 64 and thus converting linear movement of the cams into rotational movement of the housing 55 and inducing change in steering angle of the roller 38.

FIGS. 50 and 51 describe action of the swash plate 66 generally connected to the pivoting support 29 through a conventional bearing 67, operates links 59 to create oscillating and alternating steering of the roller 38 rotating housings 55, thus fulfilling steering angle requirements defined above in the FIG. 16. This method, fully tested now, provides one of the simplest control mechanisms for the present invention.

The desired algorithm of controlling steering angles 70 (see diagram in the FIG. 52) of the rollers consists of coarse range actuator 68 (for instance mechanical, like swash plate) and fine range actuator 69 augmenting the steering angle within smaller range, but with high precision and low reaction time needed for correction of the steering angle under operational conditions. The actuator 69, therefore can be chosen from the range of devices utilizing Piezoelectric or magnetostrictive principle, as well as hydraulic, pneumatic, etc.

Lubrication and cooling system per present invention employ either conventional methods or a dynamic pick up method (see also WO2011113149 (A1) by Okulov) where rotating sphere 34 with surface 33 (FIG. 53) causes oil to collect under centrifugal force at the periphery of the sphere creating a rotating ring of oil 71 (FIG. 54). Dynamic pick-up tube 72 with opening 73 facing the rotating oil ring brings oil under pressure through filtering loop 72' to filter 74 and then, through return line 75 back to the inner cavity of the sphere 34. Part of the oil can be sprayed before entering the loop 72' back into the cavity. Depending on the extremes of the tilting angle of carrier 26 the tube opening 73 should be positioned in a such way it picks up a desired portion of the oil from the rotating ring 71. However, at closest proximity of the rollers 38 to its "bottom" position (highest depth of the oil in the ring 71) the rollers 38 do not rotate (tilting angle 90 degrees, transmission ratio 1:1) and flooding of the contact points is not diminishing traction and torque capacity of the system.

Manufacturability wise, assembly process for inner cavity spherical drives includes using roller carrier arranged as an assembly of at least two pieces, which can be passed through the opening of the sphere and linked together inside the sphere. Further, a possibility exists for machining of a hollow sphere, providing a notch line on the outer surface, cooling the part to an appropriate criogenic temperature and breaking the sphere so that the two halves can be reassembled with high degree of precision provided by the perfectly mating pattern of broken material.

Turning now to the efficiency of the drives per present invention, it reduces near zero output ratio as rollers are steered at very shallow angles and losses through the lateral slip become significant (see diagram in FIG. 55). However, compared with conventional IVTs employing power loops the losses encountered in present configuration are much lesser.

It is desirable to have two different states allowing to maximize the overall efficiency: one, within the range of ratios spanning from negative to about 1:1 where carrier tilting angle is fixed, but rollers' steering angle is alternating; and another one, where rollers steering angle is fixed (approximately at 90 degrees), but the carrier 26 tilts. The transition point between these two states is accordingly defined as one where all rollers start or stop (at ~90 degrees) their alternating steering motion. Tilting angle of the carrier 26 is shown in detail in the FIG. 56.

In terms of variety of modes of use of the present invention the following are the most significant applications:

A car transmission and drive train employing conventional kinetic energy recovering system shown in the FIG. 57 includes engine or motor 75, connected through clutch 77 to the input shaft of the IVT 78 further linked through drivetrain 79 and differential 80 with wheels 81. During braking, the clutch 76 disengages the engine 75 and energy of braking is fed into flywheel 82, which can be engaged using clutch 77. The flywheel 82 receives rotating energy via IVT and its speed can be constantly increased by changing the ratio of the IVT while the car is reducing its speed during braking till its full stop. Then, when the car accelerates, the energy of flywheel 82 can be utilized for acceleration, again by proper management of the IVT ratio and re-engagement of clutch 76 to switch from use of the flywheel to use of the engine or motor.

A typical oil pump jack application (FIG. 58) will benefit from IVT for start up operation and proper management of the well depending on the amount of oil available for pumping. For current applications refer to products of Turbo Trac USA.

A windmill equipped with electric generator can utilize a high step-up ratio transmission with variable drive per present invention (FIG. 59).

A boat (FIG. 60), a passenger car (FIG. 61) and an electric diesel or gas engine generator (FIG. 62) will also benefit from use of IVT or CVT per present invention due to its ability to perform in the wide range of torques, speed ratios and offering low cost compared to known devices.

A variety of linear actuators can also employ present invention (FIG. 63).

A tiltable and rotatable joint per FIG. 64 can be used in numerous robotic and medical applications, including those involving artificial and mechanized limbs or prosthesis.

The ability to convey linear motion into rotational motion of present invention can be also used in such application as piston engines where reciprocating piston 83 (FIG. 66) linked with cylindrical surface 84 equipped with bundle of steerable alternating rollers 85 in clamping contact with it provides for rotation of the output shaft 86, thus ensuring not only simple conversion of the reciprocating movement into rotary motion, but also providing a practical method of variating the output rotational speed or changing its direction without any additional transmission.

An experimental setup was fabricated according to the principles of the present invention in order to evaluate the performance thereof. This example and the following description are intended primarily for the purposes of illustration.

The following picture (FIG. 67) shows a general view of the working model of present invention. The input shaft 86 is driving the carrier 87 equipped with 3 steerable rollers 88 orbiting sphere 89. Swash plate 90 tilting angle of which is controlled by ration control lever 91 is linked to individual rotating housings of the rollers 88 through links 92. The output shaft 93 is connected to the sphere 89. This system is capable of providing transmission ratios in the range from negative, through zero to positive output ([output speed]: [input speed]=−2:1; 0; 1.5:1). A workable IVT per this geometry, employing 6 steerable rollers and a sphere of OD35 mm can transfer approximately 4.5 kW of energy at 8000 RPM input and 2000 RPM output with efficiency of 0.96.

Mode for the Invention

Mode for Invention

Although the invention has been described according to an exemplary embodiment, it should be understood by those of ordinary skill in the art that modifications may be made without departing from the spirit of the invention. The scope of the invention is not to be considered limited by the description of the invention set forth in the specification or example, but rather as defined by the following claims. The modifications to the various aspects of the present invention described hereinabove are merely exemplary. It is understood that other modifications to the illustrative embodiments will readily occur to persons with ordinary skill in the art. All such modifications and variations are deemed to be within the scope and spirit of the present invention as defined by the accompanying claims.
<<< >>>

INDUSTRIAL APPLICABILITY

Automotive: IVT or CVT for power drive (motor to wheels) and auxiliary equipment drives (fan drive, HVAC system drive, alternator drive), etc.

Aerospace: Turbo-prop engine drives, emergency electric generator drives, actuators, etc.

Industry: Pulp and paper machinery drives, conveyor drives, actuators, etc.

Marine: Main and steering system propulsion unit drives, electric generator drives, etc.

Power generation: Variable speed drives for diesel and natural gas engines generators, wind mill generators (low speed to high speed), etc.

Oil & Gas: Compressors with variable drives, natural gas liquefying stations, oil well pumps, etc.

Medical: Artificial knees and joints, limbs; variable speed fluid pumps, etc.

HVAC: Variable speed compressors and expanders.
Sequence Listing Free Text
Sequence List Text

The invention claimed is:

1. A method for achieving an infinitely variable drive or transmission by providing a drive member and a driven member either of which can be represented by at least one roller pressed against an opposite member's surface thus creating at least one point of frictional or traction contact capable of transmitting power and additionally creating a virtual surface tangential to the roller and to the said surface at said contact point; the first direction of movement defined by the first vector of movement of said surface relative to said contact point and the second direction of the movement defined by the path comprised of the second vector of the movement of said roller as projected to said virtual surface; and the third direction as defined by the third vector of rolling direction of the roller as projected to said virtual surface where the movement direction angle between said first vector of movement and said second vector of movement and the steering angle defined as an angle between second vector of movement and third vector of movement is generally defined by said steering angle and a correction angle applied to said steering angle and which are for each roller varied in accordance with desired transmission ratio and lateral/thrust load on the roller while respecting the elastic/elasto-plastic/plastic deformability of said traction points of contact for a given physical condition of the contact.

2. The method of claim 1 wherein each roller's correction angle is defined individually.

3. The method of claim 1 wherein said method for achieving an infinitely variable drive or transmission employs at least two rollers contacting said surface.

4. The method of claim 3 where the normals to the said virtual surfaces at the said points of contact intersect.

5. An infinitely variable transmission or variable angular or linear actuator or both having an input member and an output member surfaces of bodies of rotation frictionally engaged with each other and capable of moving relative to each other at speeds determined by the desired transmitting ratio where either member can be represented by at least one steerable roller in junction with the opposite surface defined by at least one frictional point between said surfaces wherein: while rolling, said frictional point's trajectory resembles an open loop or closed loop helical path and wherein the rolling direction of the roller may either remain constant or alternate during one movement cycle over said path compared to the alignment of the said rolling direction of the roller with the direction of movement of said surface when these two directions are aligned.

6. The variable transmission of claim 5 wherein said steerable roller has a carrier rotatable around its axis which intersects with the axis of symmetry of the body of rotation of the opposite member.

7. The variable transmission of claim 6 where said carrier's axis of rotation is parallel to the direction of the linear movement of the axis of symmetry of the opposite member.

8. A traction drive with input and output members wherein either one of them is represented by a body with surface and another one is represented by at least two steerable rollers being in contacting relation by their outer surfaces with said surface of the opposite member by at least two junctions capable of transferring power primarily through traction, where said rollers are supported by a carrier wherein the normals to said surface at said two junctions are intersect at one point, said carrier is rotatable and said rollers are steerable alternating their rolling direction depending on the desired ratio of transmission of movement from said input to said output members, their relative angles of movement against each other at said contact junctions and the deformations of said contact junctions under the traction load.

9. The traction drive of claim 5 where said steerable rollers can have either fixed direction of steering, for instance approximately 90° compared with the direction of the movement of the roller, or steering direction can alternate.

10. The traction drive of claim 5 where said roller's axis of rotation and the line tangential to the point of contact intersect in proximity to the center of the radius of curvature of said path drawn through the point of contact as it seen in the virtual plane tangential to said point of contact.

11. The traction drive of claim 5 where one of the members is a rotating body and another member is linearly moving body.

12. The traction drive of claim 5 where one of the members is a rotating body and another member is a tilting body.

13. The traction drive of claim 5 where one of the members is a rotating body and another one is a tilting and rotating body, particularly applicable for use in robotic applications or artificial limbs or prosthesis.

14. The traction drive of claim 1, where said roller has a steering lever actuated by a link connected to a swash plate which is linked with system for controlling ratio between said input and output.

15. The traction drive of claim 5, where said steerable roller has and additional steering angle adjustment means actuated by at least one of the following: Piezoelectric actuator, Magnetostrictive actuator, Electromagnetic actuator, Pneumatic actuator or Hydraulic actuator.

16. The traction drive of claim 8 where said carrier is driven by a double Cardan or other suitable Constant Velocity Joint.

17. A variable transmission having input and output members comprised of rotating bodies in frictional and rolling contact one to another where at least one body is represented by a steerable roller and each contact junction is loaded by a clamping force controlled individually and which depends on the amount of traction force vector perpendicular to the rotational direction of each of said rollers and where said clamping force is controlled independently from said steering angle.

18. The variable transmission of claim 17 where said clamping force further depends on traction properties of frictional contact.

19. A variable transmission having input and output members comprised of rotating bodies in frictional and rolling contact one to another where at least one body is represented by a steerable roller and each contact junction is loaded by a clamping force which depends on the amount of traction force vector perpendicular to the rotational direction of each of said rollers and said frictional contact contains traction fluid.

20. The variable transmission of claim 19 where said traction fluid is non-oil based allowing material-to-material contact of said frictional and rolling contact.

21. The variable transmission of claim 20 where said fluid has at least one of surface cleaning and heat transfer functions and secondary traction functions.

22. A variable transmission having input and output members comprised of rotating bodies in frictional and rolling contact one to another where at least one body is represented by a steerable roller and each contact junction is loaded by a clamping force which depends on the amount of traction force vector perpendicular to the rotational direction of each of said rollers where at least one of the said members' surfaces is comprised of Chromium.

23. A variable transmission having input and output members comprised of rotating bodies in frictional and rolling contact one to another where at least one body is represented by a steerable roller and each contact junction is loaded by a clamping force which depends on the amount of traction force vector perpendicular to the rotational direction of each of said rollers said transmission further comprising sensory means, a processor and actuating means for computing and execution of one or both of the clamping force and said roller's steering.

24. A variable ratio mechanical transmitting means having first member with rotating body orbiting a path and second body with surface in frictional and clamping rotatable contact with said first member, steering system controlling rolling direction of said first rotating body during its movement around said path wherein said first rotating body is carrying a lateral load substantially perpendicular to its rotational plane and where the clamping force between said first and second members is substantially proportional to said lateral force.

25. The variable transmission of claim 24 where said steering system is controlled in relation to said load, position of said rotating body on the path and desired transmitting ratio between said first and second member.

26. The variable transmission of claim 24 where steering axes of all rollers intersect at one point.

27. The variable transmission of claim 26 where point of intersection lies is within the second body.

* * * * *